(12) United States Patent
Ghorbanloo

(10) Patent No.: US 9,308,771 B2
(45) Date of Patent: Apr. 12, 2016

(54) SYSTEM AND A METHOD FOR DRAWING ARCS AND CIRCLE

(71) Applicant: Farhad Ghorbanloo, Zanjan (IR)

(72) Inventor: Farhad Ghorbanloo, Zanjan (IR)

( * ) Notice: Subject to any disclaimer, the term of this patent is extended or adjusted under 35 U.S.C. 154(b) by 0 days.

(21) Appl. No.: 14/877,123

(22) Filed: Oct. 7, 2015

(65) Prior Publication Data

US 2016/0023502 A1 Jan. 28, 2016

Related U.S. Application Data

(60) Provisional application No. 62/066,868, filed on Oct. 21, 2014.

(51) Int. Cl.
*B43L 9/04* (2006.01)
*B43L 9/00* (2006.01)

(52) U.S. Cl.
CPC .. *B43L 9/04* (2013.01); *B43L 9/005* (2013.01)

(58) Field of Classification Search
CPC ........................................................ B43L 9/005
USPC ......................................................... 33/27.03
See application file for complete search history.

(56) References Cited

U.S. PATENT DOCUMENTS

| 211,825 | A | * | 1/1879 | Worthington | B43L 9/04 33/27.05 |
|---|---|---|---|---|---|
| 390,360 | A | * | 10/1888 | Gieseler | B43L 9/04 33/27.05 |
| 2,349,670 | A | * | 5/1944 | Moxey | B43L 9/045 33/27.03 |
| 2,442,505 | A | * | 6/1948 | Millett | B23K 37/0205 188/184 |
| 2,523,237 | A | * | 9/1950 | Richardson | B23K 7/105 266/66 |
| 2,817,903 | A | * | 12/1957 | Mead | B43L 9/04 33/27.05 |
| 3,174,736 | A | * | 3/1965 | Cameron | B23K 7/107 266/66 |
| 3,430,347 | A | * | 3/1969 | Minniear | B43L 9/04 33/27.03 |
| 4,680,864 | A | * | 7/1987 | Heagerty | B43L 9/00 33/26 |
| 9,073,381 | B1 | * | 7/2015 | Elmassry | B43L 9/045 |

FOREIGN PATENT DOCUMENTS

| FR | 2575420 A1 | * | 7/1986 | B43L 9/00 |
| GB | 2255750 A | * | 11/1992 | B43L 9/005 |
| GB | 2352690 A | * | 2/2001 | B62B 3/001 |

* cited by examiner

*Primary Examiner* — Christopher Fulton
(74) *Attorney, Agent, or Firm* — Barry Choobin; Patent 360 LLC

(57) ABSTRACT

The embodiments herein disclose a compass for drawing arcs and circles without the need for accessing the center. The compass comprises a chassis fixed with a first guide wheel and a second guide wheel at two opposite ends. A protractor is fixed to the first guide wheel for setting an angle for the first guide wheel. An offset wheel is installed under the offset axis frame arranged perpendicular to the chassis next to the second guide wheel. A tool holder is mounted on the offset axis frame using a clip. A laser pointer is mounted on the offset axis frame for identifying a desired part of the arcs and circles. A balance wheel is attached to the balance base arranged perpendicular to the chassis for maintaining a stability of the compass. A marker is inserted in a tool holder for marking the arcs and circles.

13 Claims, 12 Drawing Sheets

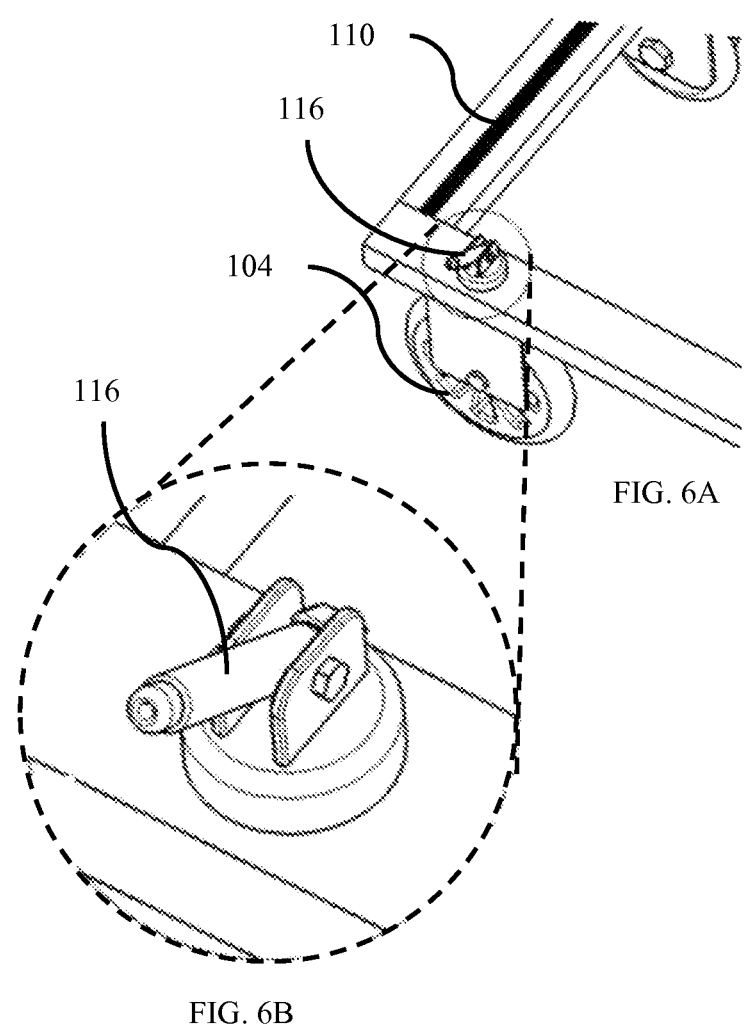

SYSTEM AND A METHOD FOR DRAWING ARCS AND CIRCLE

BACKGROUND

1. Technical Field

The embodiments herein are generally related to devices and instruments used in geometry. The embodiments herein are particularly related to a measuring and drawing instruments. The embodiments herein are more particularly related to a compass used for drawing arcs and circles in a flat or in a relatively flat surface, without a need to have access to the center.

2. Description of the Related Art

Drawing and measuring instruments are invented for measuring physical quantities and comparing physical quantities of the real-world objects and events. A compass is an essential drawing instrument that is used for inscribing circles and arcs.

Today compasses are used in almost all the industries. However, the conventional compasses are not usable when the radius is very large and the center is not accessible. Further, the conventional compasses are not feasible to use. when there is a barrier between the center and the arc. The use of the conventional compasses in the above-mentioned circumstances are complex, time-consuming and inefficient.

Hence, there is a need for a drawing tool that is capable of drawing the arcs and circles without the need for accessing the center. Further, there is a need for a drawing tool that is capable of drawing arcs and circles for large radius. Still further, there is a need for a drawing tool that is capable of drawing arcs and circles when there is a barrier between the center and the arc.

The above-mentioned shortcomings, disadvantages and problems are addressed herein and which will be understood by reading and studying the following specification.

OBJECTS OF THE EMBODIMENTS HEREIN

The primary object of the embodiments herein is to provide a compass for drawing the arcs and circles in a flat surface or in a relatively flat surface without the need for accessing the center.

Another object of the embodiment herein is to provide a compass for drawing the arcs and circles for a relatively larger radius.

Yet another object of the embodiment herein is to provide a compass for drawing the arcs and circles even when there are barriers between the center and the arc.

Yet another object of the embodiments herein is to provide a compass for drawing the arcs and circles when the center is suspended in the space.

These and other objects and advantages of the embodiments herein will become readily apparent from the following detailed description taken in conjunction with the accompanying drawings.

SUMMARY

The various embodiments herein provide a compass device for drawing arcs and circles without a need for accessing the center. According to an embodiment herein, the compass comprises a chassis for providing a framework for a plurality of components of the compass. The chassis is mounted with two guide wheels at two opposite ends. A first guide wheel is configured for initiating a movement of the compass. The first guide wheel is installed at one end of the chassis. The first guide wheel is an angled wheel. The angle of the first guide wheel is set by a user. A second guide wheel is configured for enabling a movement of the compass. The second guide wheel is attached to another end of the chassis. The second guide wheel is a fixed wheel. A protractor is configured for setting an angle for the first guide wheel. The protractor is mounted on the chassis. An offset axis frame is attached to the chassis for providing a framework for a plurality of components of the compass. The offset axis frame is installed perpendicular to the chassis next to the second guide wheel. A tool holder is provided for holding a marking device. The tool holder is mounted on the offset axis frame. The tool holder is adjusted on the offset axis frame using an indicator. The tool holder is adjusted on the offset axis frame using a clip. An offset wheel is arranged for providing a balance for the compass. The offset wheel is installed under the offset axis frame. A laser pointer is provided for identifying a desired part of the arcs and circles. The laser pointer is mounted on the offset axis frame. The laser pointer is placed at a symmetry center of the second guide wheel. A balance base is attached to the chassis for maintaining a stability of the compass. The balance base is arranged perpendicular to the chassis. A balance wheel is attached to the balance base. The balance wheel is installed under the balance base. The balance base and the balance wheel are configured to prevent an imbalance of the compass. A marker is provided for marking the arcs and circles. The marker is inserted in a tool holder. The marker is controlled by adjusting the tool holder.

According to an embodiment herein, the compass is used for drawing arcs and circles for a flat surface.

According to an embodiment herein, the compass is used for drawing arcs and circles in a relatively flat surface.

According to an embodiment herein, the offset axis frame includes a ruled groove. The ruled groove on the offset axis frame is dependent on a scale of the compass.

According to an embodiment herein, the first guide wheel and the second guide wheel are installed using standard welding techniques.

According to an embodiment herein, the offset axis frame is configured to regulate a distance between the tool holder and the chassis.

According to an embodiment herein, the laser pointer is configured for aligning the radius of the arc with a desired point.

According to an embodiment herein, the balance base and the balance wheel are configured for balancing the compass.

According to an embodiment herein, the balance base and the balance wheel are configured to maintain a symmetry plane of the guide wheel perpendicular to a surface of the ground.

According to an embodiment herein, a profile of the first guide wheel and the second guide wheel is semi-circular.

According to an embodiment herein, the ruled groove has a ruled section and wherein the ruled section is calibrated to indicate a distance between a mark left by the tool and a contact point of the second guide wheel with a ground surface.

According to an embodiment herein, a range of the compass is calculated using a formula $m=r/a$, wherein $m$ is a multiplication factor, $r$ is a radius of arc or circle and $a$ is a distance between a symmetry center of the first guide wheel and the second guide wheel, and wherein the value of $m$ is equal to 57.2899.

According to an embodiment herein, the laser pointer is installed on the chassis in such a way that an emission line of the laser pointer is parallel to a direction of radius of the arc.

The embodiments herein provide a compass device and a method for drawing arcs and circles without the need for accessing the center. The compass comprises a chassis, a first guide wheel, a second guide wheel, a protractor, an offset axis frame, an offset wheel, a laser index, a balance base, a balance wheel, a tool holder, and a marker.

According to an embodiment herein, the chassis is used for providing a framework for a plurality of other components of the compass.

According to an embodiment herein, the first guide wheel is used for initiating a movement of the compass. The first guide wheel is installed at one end of the chassis. According to an embodiment herein, the first guide wheel is referred as an angled wheel and the angle for the movement of the guide wheel is set by a user.

According to an embodiment herein, the second guide wheel is used for the movement of the compass. According to an embodiment herein, the second guide wheel is fixed.

According to an embodiment herein, the protractor is used for setting the angle for the first guide wheel. The protractor is mounted on the chassis.

According to an embodiment herein, the offset axis frame is used for providing a framework for a plurality of components of the compass. The offset axis frame is installed perpendicular to the chassis and next to the second guide wheel.

According to an embodiment herein, a tool holder is used for holding a marking device. The marking device is mounted on the offset axis frame and adjusted using an indicator. The tool holder is adjusted on the offset axis frame using a clip.

According to an embodiment herein, the offset wheel is used for providing a balance for the compass. The offset wheel is installed under the offset axis frame.

According to an embodiment herein, the laser index is used for identifying the desired parts of the arcs and circles. The laser index is mounted on the offset axis frame. Further, the laser index is placed at the symmetry center of the second guide wheel.

According to an embodiment herein, the balance base is used for maintaining the stability of the compass. The balance base is placed perpendicular to the chassis.

According to an embodiment herein, the balance wheel is attached to the balance base. The combination of the balance base and the balance wheel prevents the imbalance of the compass.

According to an embodiment herein, a marker is used for marking arcs and circles. The marker is inserted in a tool holder, and the position of the marker is adjusted by adjusting the tool holder.

According to an embodiment herein, the compass is used for drawing arcs and circles in a flat surface.

According to an embodiment herein, the compass is used for drawing arcs and circles in a relatively flat surfaces.

According to an embodiment herein, the offset axis frame includes a ruled groove, and the grooves on the offset axis are dependent on the scaling level of the compass.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 6A illustrates a topside view a line laser mounted on a rotational axis of a fixed wheel in the compass device, according to an embodiment herein.

FIG. 6B illustrates an enlarged top side view of the line laser mounted on a rotational axis of a fixed wheel in the compass device, according to an embodiment herein.

Figure 1:
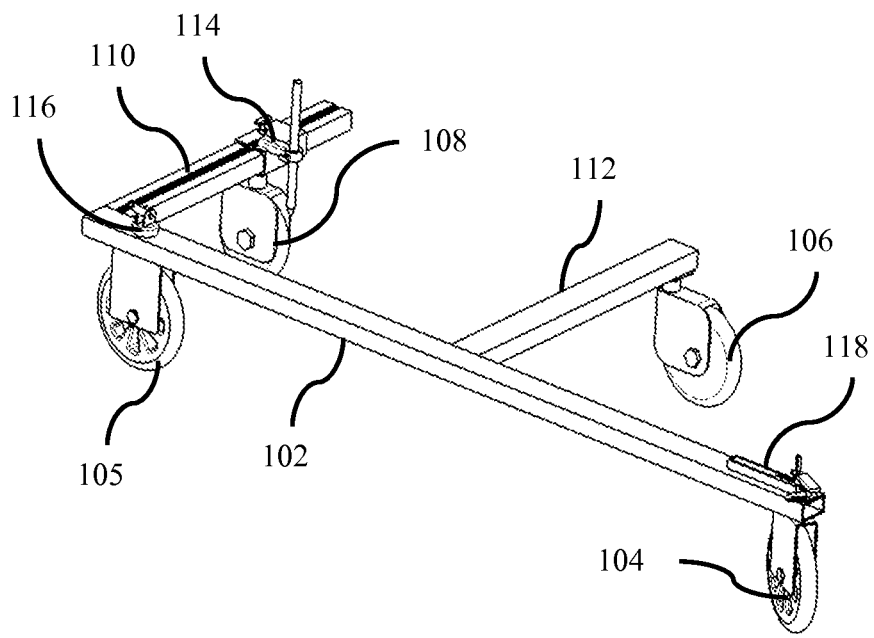
FIG. 1 illustrates a top side perspective view of a compass device, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a compass for drawing arcs and circles without the need for accessing the center, the compass comprises a chassis, a first guide wheel, a second guide wheel, a protractor, an offset axis, an offset wheel, a laser index, a balance base, a balance wheel, a tool holder, and a marker.

According to an embodiment herein, the chassis is used for providing a framework for a plurality of other components of the compass.

According to an embodiment herein, the first guide wheel is used for initiating a movement of the compass. The first guide wheel is installed at one of the ends of the chassis.

According to an embodiment herein, the first guide wheel is referred as an angled wheel and the angle for the movement of the guide wheel is set by a user.

According to an embodiment herein, the second guide wheel is used for the movement of the compass. According to an embodiment herein, the second guide wheel is a fixed wheel.

According to an embodiment herein, the protractor is used for setting the angle for the first guide wheel. The protractor is mounted on the chassis.

According to an embodiment herein, the offset axis is used for providing a framework for a plurality of components of the compass. The offset axis is installed perpendicular to the chassis and next to the second guide wheel.

According to an embodiment herein, a tool holder is used for holding a marking device. The marking device is mounted on the offset axis and adjusted using an indicator. The tool holder is adjusted on the offset axis using a clip.

According to an embodiment herein, the offset wheel is used for providing a balance for the compass. The offset wheel is installed under the offset axis.

According to an embodiment herein, the laser index is used for identifying the desired parts of the arcs and circles. The laser index is mounted on the offset axis. Further, the laser index is placed at the symmetry center of the second guide wheel.

According to an embodiment herein, the balance base is used for maintaining the stability of the compass. The balance base is placed perpendicular to the chassis.

According to an embodiment herein, the balance wheel is attached to the balance base. The combination of the balance base and the balance wheel prevents the imbalance of the compass.

According to an embodiment herein, a marker is used for marking arcs and circles. The marker is inserted in a tool holder, and the position of the marker is adjusted by adjusting the tool holder.

According to an embodiment herein, the compass is used for drawing arcs and circles in a flat surface.

According to an embodiment herein, the compass is used for drawing arcs and circles in a relatively flat surface.

According to an embodiment herein, the offset axis includes a ruled groove, and the grooves on the offset axis is dependent on the scaling level of the compass.

FIG. 1 illustrates an isometric view of a compass, according to an embodiment herein. The compass is used for drawing arcs and circles without the need for locating the center. The compass is used when there is an obstacle for reaching the center of the circle or the arc.

The compass comprises a chassis 102, a guide wheel 104, a guide wheel 105, a balance wheel 106, an offset wheel 108, an offset axis 110, a balance base 112, a tool holder 114, a laser index 116, a protractor 118, and a marker 120.

The arc or the circle is drawn on a flat surface or a relatively flat surface using the marker 120 of the compass. According to an embodiment herein, the compass works on a mechanism used in vehicles such as bicycle, motorcycle, and the like. The chassis 102 is similar to the chassis of the vehicles and two wheels.

The chassis 102 refers to a framework on which the guide wheel 104, the guide wheel 105, the laser index 116, and the protractor 118 are installed. The guide wheel 104 and the guide wheel 105 are installed at both the ends of the chassis 102. According to an embodiment herein, the guide wheel 104 is also referred to as an angled wheel. The guide wheel 104 is installed on the chassis with the help of attachments. The guide wheel 104 has the ability to change the angle of movement relative to the horizontal chassis 102. Further, a user of the compass has an option to adjust and fix the desired angle of the guide wheel 104 by measuring the angle through the protractor 118.

According to an embodiment herein, the guide wheel 105 is referred as a fixed wheel. The guide wheel 105 does not have the ability to change the angle relative to the horizontal axis of the chassis 102. Further, the guide wheel 105 is fixed to the chassis and does not move. Therefore, a rotating axis of guide wheel 105 is always perpendicular to the horizontal axis of the chassis 102.

The protractor 118 is mounted on the chassis 102. According to an embodiment herein, the protractor 118 is installed on a shaft of the guide wheel 104. The protractor 118 is used for adjusting the angle of the guide wheel 104. According to an embodiment herein, the protractor 118 is an analog protractor. According to an embodiment herein, the protractor 118 is a digital protractor. The user of the compass sets the angle for adjusting the guide wheel 104.

The offset axis 110 is a framework that is perpendicular to the horizontal axis of the chassis 102. The offset axis 110 is installed on the chassis 102 and next to the guide wheel 105. The tool holder 114 is mounted on the offset axis 110 and moved easily. According to an embodiment herein, the tool holder 114 is adjusted on the offset axis 110 using an indicator and is fixed using a clip. According to an embodiment herein, the offset axis 110 is used for regulating the distance between the tool holder 114 and the chassis 102.

Further, the offset axis 110 includes a ruled groove. According to an embodiment herein, the grooves on the offset axis 110 is dependent on the scale of the compass. For example, the grooves on the offset axis 110 are in terms of millimeter when the compass is used for constructing arcs and circles with small radius. In another example, the grooves on the offset axis 110 are in terms of centimeters and meters when the radius of the circle or the arc is very large.

The offset wheel 108 is installed at the offset axis 110. According to an embodiment herein, the offset wheel 108 provides a balance to the offset axis 110. According to an embodiment herein, the laser index 116 is installed on the upper side of the chassis 102. The laser index 116 is parallel to the rotation axis of the guide wheel 105. According to an embodiment herein, the laser index 116 is placed at the symmetry center of the guide wheel 105, due to which the surface of the laser index 116 and the symmetry center of the guide wheel 105 are perpendicular to the sides of the chassis 102. The arrangement of the laser index 116 as mentioned above ensures a placing of the arc towards a desired point.

According to an embodiment herein, the balance base 112 is installed on the center of the chassis 102. The balance base 112 comprises a cubic part and the balance wheel 106. The balance base 112 and the balance wheel 106 maintain the balance and stability of the device. Further, the balance base 112 and the balance wheel 106 prevent the compass from measuring wrong radius due to imbalance of the compass.

According to an embodiment herein, the balance base 112 is used for balancing the device and maintaining the symmetry plane of the guide wheel 104 perpendicular to the surface of the ground.

The tool holder 114 is mounted on the offset axis 110 for holding the marker 120. According to an embodiment herein, a maker 120 is installed on the offset axis 110. The examples of the marker tool includes, but are not limited to a cutting tool, a pencil, a jet burner, a permanent marker, a temporary marker, and the like. The marker 120 is adjusted in such a way that the mark left by the marker 120 falls along with the rotation axis of the guide wheel 105.

According to an embodiment herein, the chassis 102, the offset axis 110, the balance base 112 are made from rigid material. The example of the rigid material used for manufacturing the chassis 102, the offset axis 110, and the balance base 112 include but are not limited to a rectangular steel tube.

According to an embodiment herein, the base of the laser index 116, the tool holder 114, the inner part of the guide wheel 104, the guide wheel 105, the balance wheel 106, and the offset wheel 108 are made from butadiene-styrene.

According to an embodiment herein, the exterior part of the guide wheel 104, the guide wheel 105, the balance wheel 106, and the offset wheel 108 are made from material such as polyamide.

According to an embodiment herein, the material of each part of the compass is changed based on a purpose and is different for different purposes. The material used for constructing the compass is defined based on the working purposes of the compass. For example, the shape and the material of the compass used in the wood industry is different with the shape and material of the compass used in the field of the civil engineering.

Figure 2:
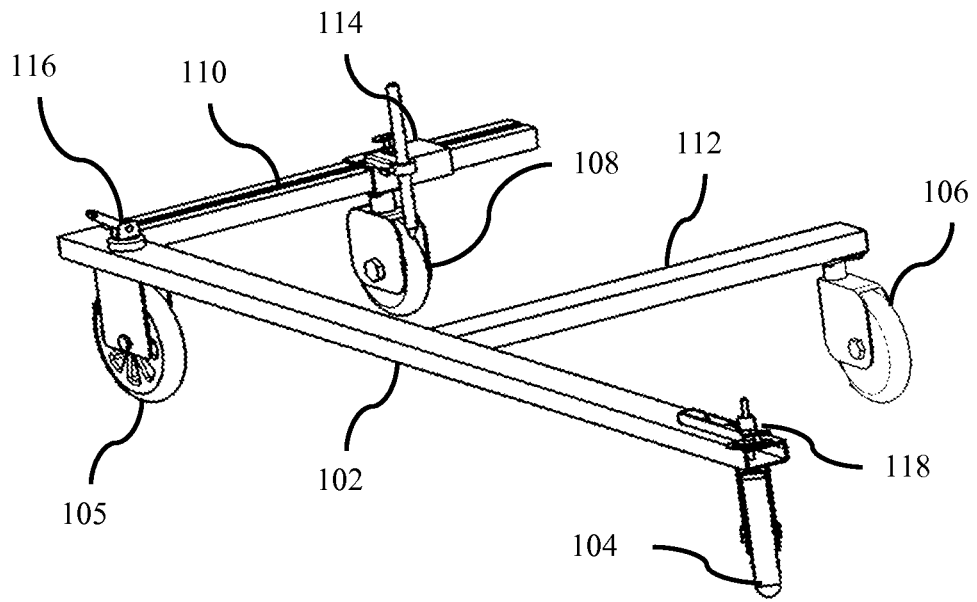
FIG. 2 illustrates a side view of the compass, according to an embodiment herein.

FIG. 2 illustrates a side view of the compass, according to an embodiment herein. The compass comprises the chassis 102, the guide wheel 104, the guide wheel 105, the balance wheel 106, the offset wheel 108, the offset axis 110, the balance base 112, the tool holder 114, the laser index 116, the protractor 118, and the marker 120.

Figure 3:
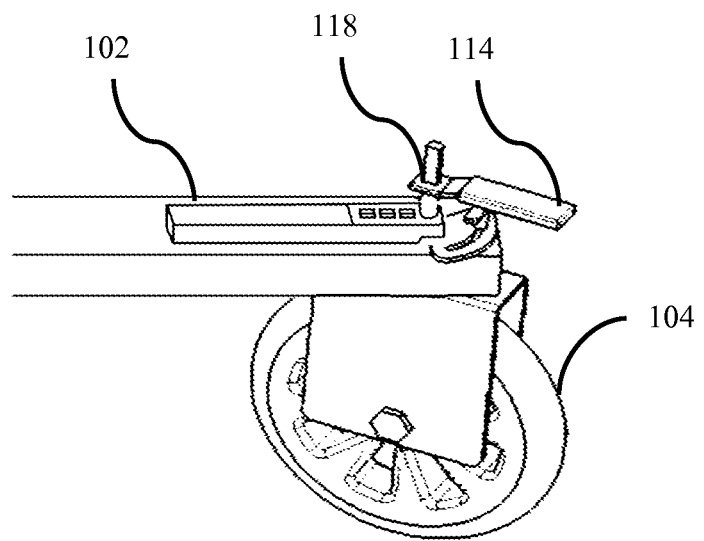
FIG. 3 illustrates a partial perspective view of a main frame mounted with a protractor and a guide wheel (angled wheel) in a compass device, according to an embodiment herein.

FIG. 3 illustrates a protractor mounted on a chassis installed to a shaft of an angled wheel, according to an embodiment herein. According to an embodiment herein, the protractor 118 is used for setting and measuring the angle at which the circle or an arc is drawn. The protractor 118 is used for setting and measuring the angle of the arc. According to an embodiment herein, the guide wheel 104 is capable of rotating. The angle of the rotation of the guide wheel 104 is equivalent to the angle set by the protractor 118. According to an embodiment herein, the protractor 118 regulates the angle of the guide wheel 104.

Figure 4:
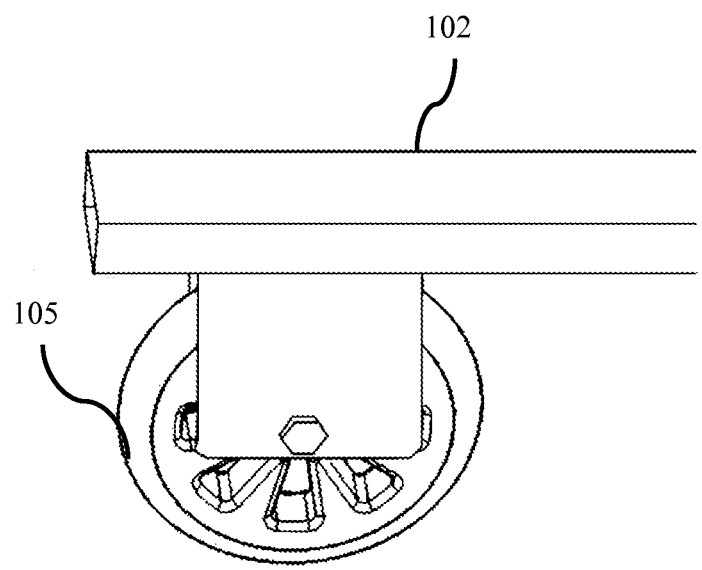
FIG. 4 illustrates a partial perspective view of a main frame mounted with a guide wheel (fixed wheel) in the compass device, according to an embodiment herein.

FIG. 4 illustrates a guide positioned relative to a rotating axis of the chassis of the compass, according to an embodiment herein. According to an embodiment herein, the guide wheel 105 is installed perpendicular to the chassis 102. The guide wheel 105 is referred as the fixed wheel. According to an embodiment, the guide wheel 105 does not move according to the change in the angles of the protractor 118.

Figure 5A:
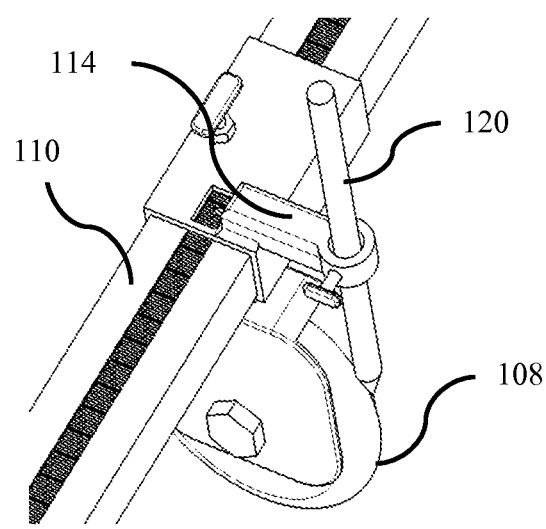
FIG. 5A and FIG. 5B illustrate a top side view of a tool holder mounted on an offset axis frame provided with an offset wheel in the compass device, according to an embodiment herein.
Figure 5B:
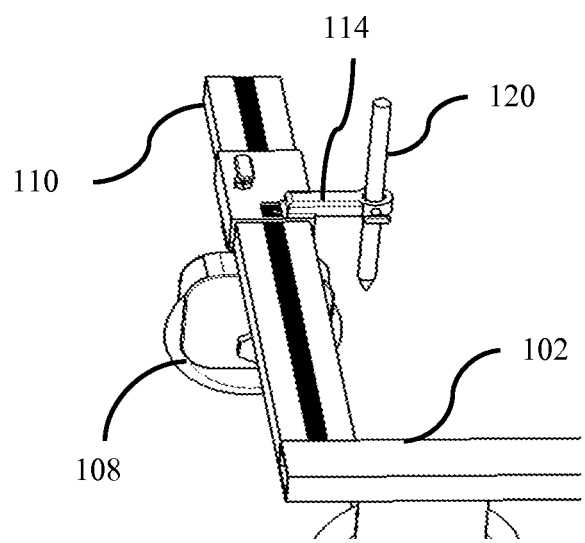

FIG. 5A and FIG. 5B illustrate a side view of a tool holder mounted on an offset axis, according to an embodiment herein. According to an embodiment herein, the marker 120 is placed inside a tool holder 114 for marking the arcs and circles without the need for the compass to locate the center. The tool holder 114 is attached to the offset axis 110. According to an embodiment herein, the tool holder 114 is attached to the offset axis 110 using a plurality of clips.

FIG. 6A and FIG. 6B illustrate a line laser mounted on a rotational axis of a fixed wheel, according to an embodiment herein. The laser index 116 is installed on the upper side of the chassis 102. The laser index 116 is placed on the symmetry center of the guide wheel 104, which helps the compass to balance and aligns the radius of the arc towards the desired point. The laser index 116 is used for aligning the radius of the arc with a desired point or a line.

According to an embodiment herein, the laser index 116 is installed on the chassis 102 such a way that the emission line of the laser index 116 is parallel to the direction of the arc. The laser index 116 is used to align the direction of the radius with the desired direction or the desired point. According to an embodiment herein, for the initial construction of the arc or the circle, the compass is placed on the desired surface and is pushed to draw the arc or the circle. However, when the compass is placed on the desired surface, the arc or the circle is drawn in a plurality of directions. According to an embodiment herein, the laser index 116 is used for deciding the direction of the radius.

According to an embodiment herein, the maximum distance the laser index 116 points is greater than the maximum radius of the compass. According to an embodiment herein, the laser index 116 that is also known as the "laser pointer distance measure" is used in the compass for providing working range greater than the actual range of the compass.

Figure 7:
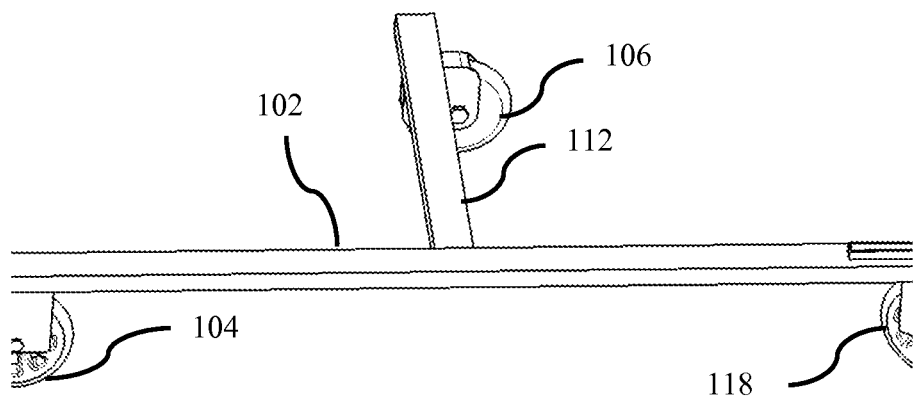
FIG. 7 illustrates a topside perspective view of a balance base installed on a middle of a chassis, according to an embodiment herein.

FIG. 7 illustrates a balance base installed on a middle of a chassis, according to an embodiment herein. According to an embodiment herein, the balance base 112 is installed perpendicular to the chassis 102. The balance wheel 106 is used for providing balance to the compass.

Figure 8:
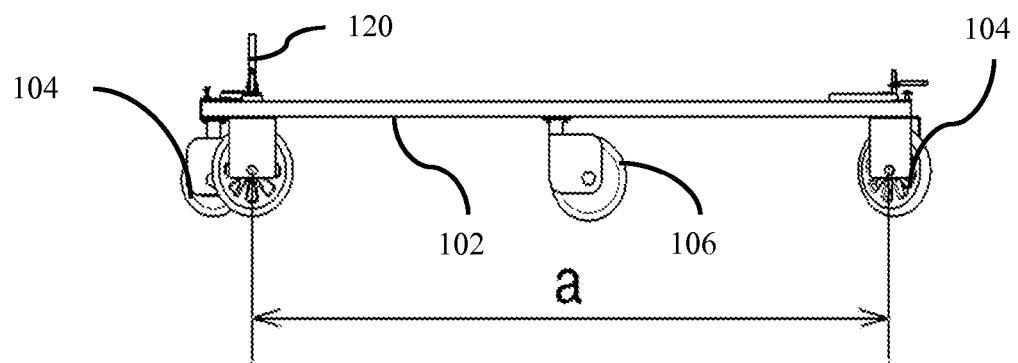
FIG. 8 illustrates a front view of a compass device indicating a distance between symmetry centers of two guide wheels, according to an embodiment herein.

FIG. 8 illustrates a distance between symmetry centers of two guide wheels, according to an embodiment herein. The FIG. 8 illustrates the construction of a circle or an arc without the need for locating the center. According to an embodiment herein, each arc or circle has a radius and a center. The distance between the symmetry center of the guide wheel is a constant which is equal to "a". According to an embodiment herein, the "a" of the compass is dependent on the utility of the compass in a plurality of industries. For example, the "a" of the compass is relatively small when used for construction of arcs and circles for drawing purposes. In another example, the "a" of the compass is relatively larger when the construction of arcs and circles is for industrial and professional construction purposes.

Figure 9:
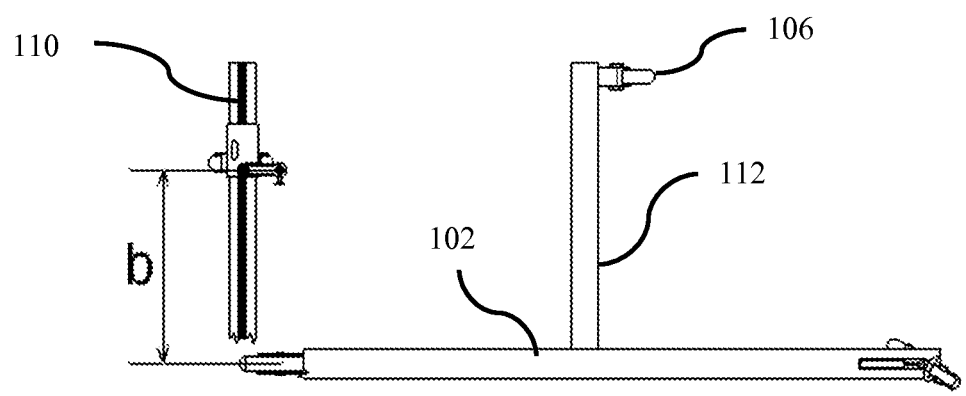
FIG. 9 illustrates a top side view of a compass indicating a distance of mark drawn by the tool from the symmetric center of the fixed guide wheels, according to an embodiment herein.

FIG. 9 illustrates a distance of mark drawn by the tool from the symmetric center of the fixed guide wheels, according to an embodiment herein. According to an embodiment herein, the distance of the mark left by the tools from the symmetric center of the guide wheel 105 is equal to "b". The value of the "b" is adjusted according to the needs of the construction of the arc or the circle.

Further, the guide wheel 104 is adjusted and fixed in the angle of "α". According to an embodiment herein, the angle of "α" is calculated using the relation:

$$\alpha = \tan^{-1}\left(\frac{a}{R+b}\right)$$

According to an embodiment herein, the angle of "α" is set in a clockwise direction. "R" is the radius of the arc or circle. Further, the horizontal axis of the chassis is set to zero. According to an embodiment herein, the angle of "a" and the angle of the axis with respect to the chassis 102 is set according to the requirements of the construction and the user. According to an embodiment herein, when the angle of "α" is positive, the arc or the circle is drawn in a clockwise direction. According to an embodiment herein, when the angle of "α" is negative, the arc or the circle is drawn in anticlockwise direction.

Figure 10:
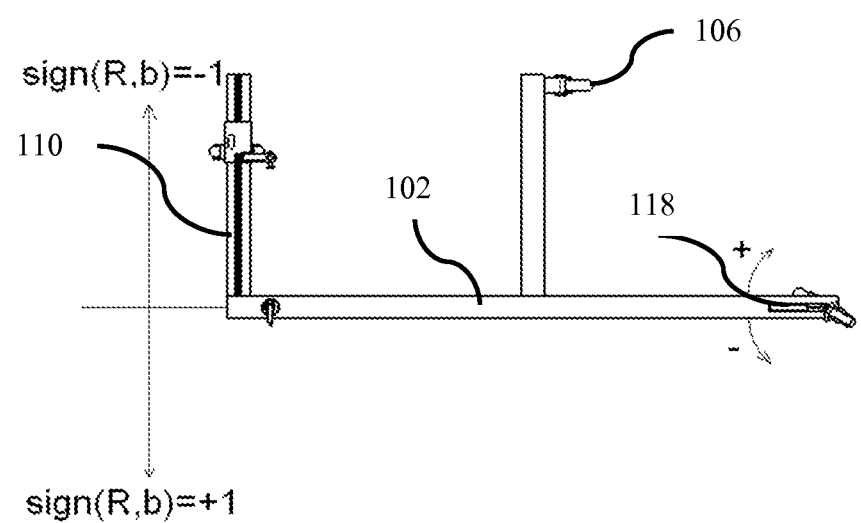
FIG. 10 illustrates a top side view of a compass indicating a true mark drawn when the horizontal axis of chassis is zero, according to an embodiment herein.

FIG. 10 illustrates a true mark drawn when the horizontal axis of chassis is zero, according to an embodiment herein. The FIG. 10 illustrates the true mark drawn by the compass when the compass is set with an angle of "a". According to an embodiment herein, the true mark left from the compass is either above or below the surface of the compass which is determined using the angle of "a".

Further, after adjusting the angle of "a", the compass is placed on the desired spot in a way that the emission line of the laser index 116 is along the circular arc center, and the mark left by the compass is placed on the desired arc. Once the compass is placed on the desired spot, the geometric position of the mark is the desired arc. According to an embodiment herein, the compass has maximum efficiency when the arcs and circles are constructed for the flat and relatively flat surfaces.

Figure 11:
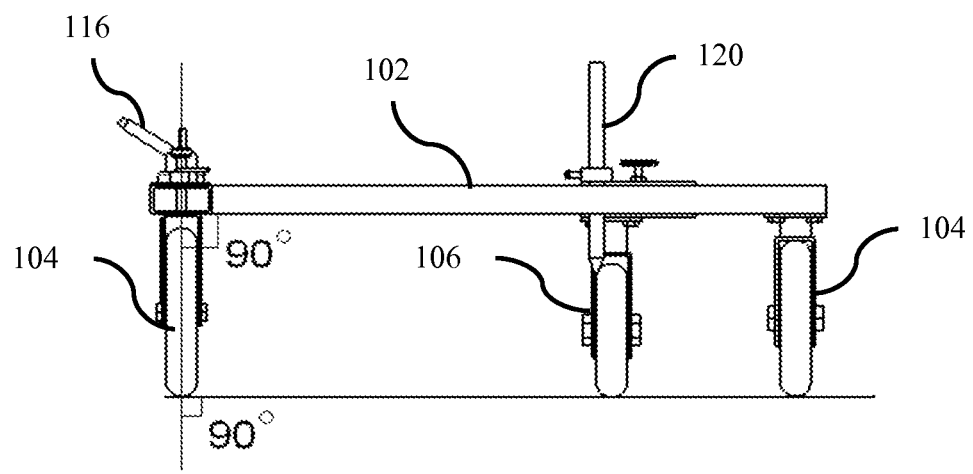
FIG. 11 illustrates a front side view of a compass indicating a guide wheel, a balance wheel, and a fixed wheel perpendicular to the surface of a ground, according to an embodiment herein.

FIG. 11 illustrates a guide wheel, a balance wheel, and a fixed wheel perpendicular to the surface of a ground, according to an embodiment herein. According to an embodiment herein, the surface of the ground including the contact points of the guide wheel 104, the guide wheel 105 and balance wheel 106 is perpendicular to the symmetric surfaces of the guide wheel 104 and the guide wheel 105. Further, the symmetric surfaces of the guide wheel 104 and the guide wheel 105 is parallel to the surface under the chassis 102.

According to an embodiment herein, the symmetric surface of the chassis 102 is perpendicular to the symmetric surface of the guide wheel 105 and include the horizontal rotating axis of the guide wheel 104.

Further, the friction co-efficient of the guide wheel 104 and the guide wheel 105 is large enough to prevent any sliding or gliding. According to an embodiment herein, the friction co-efficient of the guide wheel 104 and the guide wheel 105 ensure the continuous rotation of the guide wheel 104 and the guide wheel 105. According to an embodiment herein, the friction co-efficient of the balance wheel 106 and the offset wheel 108 is smaller than that of the guide wheel 104 and the guide wheel 105.

According to an embodiment herein, the profile of the guide wheel 104 and the guide wheel 105 is a semi-circle. According to an embodiment herein, with the increase in the diameter of the guide wheel 104, the guide wheel 105, the balance wheel 106, and the offset wheel 108, the compass provides a high precision.

According to an embodiment herein, the offset axis 110 is perpendicular to the chassis 102. Further, the calibration of the ruled section of the offset axis 110 should be perpendicular to the chassis 102. Further, the calibration of the ruled section of the offset axis is carried out such that the ruled section indicates the distance between the marks left by the compass and the contact point of the guide wheel 104 with the ground.

According to an embodiment herein, the usage range of the compass is dependent on factors influencing the degree of the arc radius, such as the distance between the guide wheel 104 and the guide wheel 105, and the angle of the guide wheel 105. According to an embodiment herein, for calculating the range of the compass, the following formula is used m=r/a.

According to an embodiment herein, where for each r, there is a certain amount of "m"; therefore, with the increase of r, m is increased. According to an embodiment herein, when b=0 and a=1, then m is equal to 57.2899, i.e., by one degree of deviation in the angle, the arc radius "r" is approximately equal to 57.2899 times the distance between the guide wheel 104 and the guide wheel 105. According to an embodiment herein, the compass has a negligible amount of error.

According to an embodiment herein, improving the precision of the protractor 118 and manufacturing decreases the amount of error. Further, the precision of the compass increases when the angle is more one degree. According to an embodiment herein, the compass is operated as a ruler by setting the angle at zero.

According to an embodiment herein, an N(numeric)-coder is added to the guide wheel 104 and by using the same, a length value of each arc is controlled so that the length value of the arcs are up to the desired value.

According to an embodiment herein, an option to add a laser index is provided to the tool holder to draw an arc that passes from the desired point.

According to an embodiment herein, by adding additional devices, the compass draws curve on the flat surfaces, due to which the amount of radius and the place of the center arc in any instant a plurality of relatively small consecutive tangent arcs are drawn.

According to an embodiment herein, by installing two electric motors to the guide wheel 104 and the guide wheel 105, and installing a servomotor to the protractor 118 and then controlling the compass by a microcontroller, the compass draws a desired curve. According to an embodiment herein, the compass has the capability to carry out the work of the 2D computer numerical control (CNC) machine in large scale without the need to have an external framework.

According to an embodiment herein, the compass is used for drawing circles and arcs when there is no access to the circular arc center.

According to an embodiment herein, the compass is used when the radius of the arc is very large for a conventional compass.

According to an embodiment herein, the compass is used when the circular arc center is suspended in space.

According to an embodiment herein, the compass is used without the need to be controlled by an external framework.

According to an embodiment herein, the compass is used to draw a long straight line by setting the angle at zero.

According to an embodiment herein, the compass allows drawing a plurality of tangent arcs in a row, and producing a variety of curves. Since the compass operates without the need to have access to the circular arc center, the radius and the center co-ordinates are changed in a short time.

According to an embodiment herein, the compass is used for drawing a full circle.

According to an embodiment herein, the compass is operated and handled by a single person, when the size is relatively smaller.

According to an embodiment herein, the compass is used as a ruler by setting the horizontal axis of the chassis is set to zero degree.

According to an embodiment herein, the compass structure is simple and is user-friendly.

According to an embodiment herein, the simple structure of the device ensures the economical production cost.

According to an embodiment herein, using the compass for drawing arcs and circles saves resources such as time, energy, and labor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A compass device for drawing arcs and circles without a need for accessing the center, the compass comprises:
    a chassis for providing a framework for a plurality of components of the compass;
    a first guide wheel for initiating a movement of the compass, wherein the first guide wheel is installed at one end of the chassis, and wherein the first guide wheel is an angled wheel, and wherein the angle of the first guide wheel is set by a user;
    a second guide wheel for enabling a movement of the compass, wherein the second guide wheel is attached to another end of the chassis, and wherein the second guide wheel is a fixed wheel;
    a protractor for setting an angle for the first guide wheel, and wherein the protractor is mounted on the chassis;
    an offset axis frame for providing a framework for a plurality of components of the compass, wherein the offset axis frame is installed perpendicular to the chassis next to the second guide wheel;
    a tool holder for holding a marking device, wherein the tool holder is mounted on the offset axis frame, and wherein the tool holder is adjusted on the offset axis frame using an indicator, and wherein the tool holder is adjusted on the offset axis frame using a clip;
    an offset wheel for providing a balance for the compass, and wherein the offset wheel is installed under the offset axis frame;
    a laser pointer for identifying a desired part of the arcs and circles, wherein the laser pointer is mounted on the offset axis frame, and wherein the laser pointer is placed at a symmetry center of the second guide wheel;
    a balance base for maintaining a stability of the compass, and wherein the balance base is perpendicular to the chassis;
    a balance wheel attached to the balance base, wherein the balance wheel is installed under the balance base, wherein the balance base and the balance wheel are configured to prevent an imbalance of the compass; and
    a marker for marking the arcs and circles, wherein the marker is inserted in a tool holder, and wherein the marker is controlled by adjusting the tool holder.

2. The compass according to claim 1, wherein the compass is used for drawing arcs and circles for a flat surface.

3. The compass according to claim 1, wherein the compass is used for drawing arcs and circles in a relatively flat surface.

4. The compass according to claim 1, wherein the offset axis frame includes a ruled groove, and wherein the ruled groove on the offset axis frame is dependent on a scale of the compass.

5. The compass according to claim 1, wherein the first guide wheel and the second guide wheel are installed using standard welding techniques.

6. The compass according to claim 1, wherein the offset axis frame is configured to regulate a distance between the tool holder and the chassis.

7. The compass according to claim 1, wherein the laser pointer is configured for aligning the radius of the arc with a desired point.

8. The compass according to claim 1, wherein the balance base and the balance wheel are configured for balancing the compass.

9. The compass according to claim 1, wherein the balance base and the balance wheel are configured to maintain a symmetry plane of the guide wheel perpendicular to a surface of the ground.

10. The compass according to claim 1, wherein a profile of the first guide wheel and the second guide wheel is semicircular.

11. The compass according to claim 1, wherein the ruled groove has a ruled section and wherein the ruled section is calibrated to indicate a distance between a mark left by the tool and a contact point of the second guide wheel with a ground surface.

12. The compass according to claim 1, wherein a range of the compass is calculated using a formula $m=r/a$, wherein m is a multiplication factor, r is a radius of arc or circle and a is a distance between a symmetry center of the first guide wheel and the second guide wheel, and wherein the value of m is equal to 57.2899.

13. The compass according to claim 1, wherein the laser pointer is installed on the chassis in such a way that an emission line of the laser pointer is parallel to a direction of radius of the arc.

* * * * *